Sept. 16, 1924.
F. ALLISON
1,508,377
COMBINED REGULATOR AND FUSE FOR GENERATORS
Filed May 19, 1921
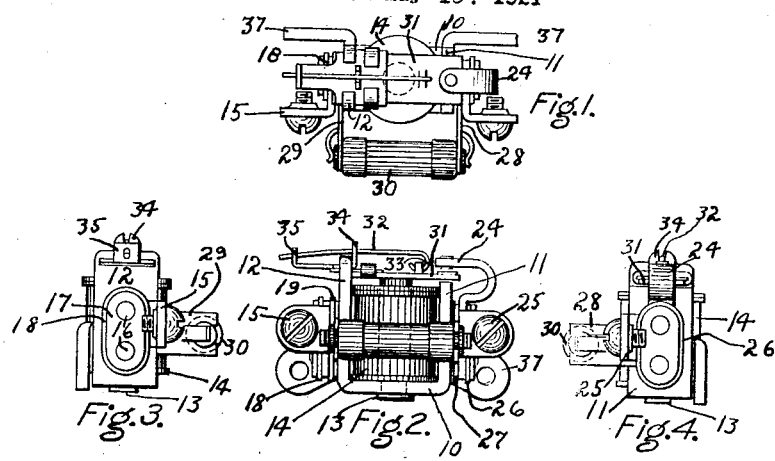
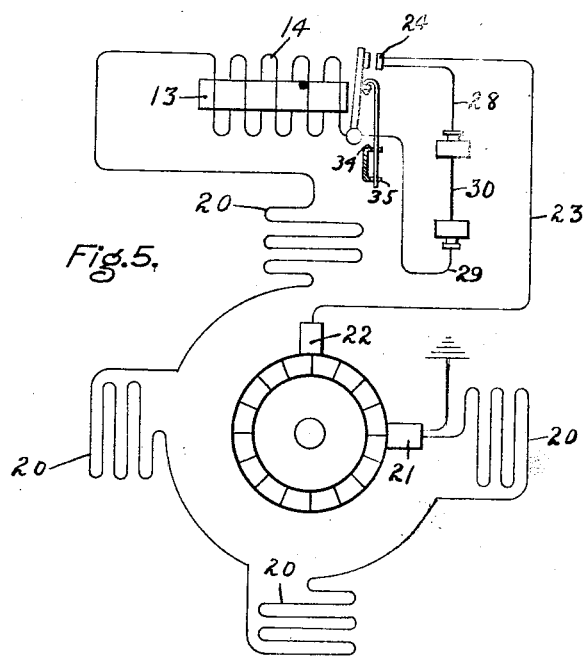
WITNESS:
E L Davis
INVENTOR.
Fred Allison
BY
J H Harness
ATTORNEY.

Patented Sept. 16, 1924.

1,508,377

UNITED STATES PATENT OFFICE.

FRED ALLISON, OF HIGHLAND PARK, MICHIGAN, ASSIGNOR TO FORD MOTOR COMPANY, OF DETROIT, MICHIGAN, A CORPORATION OF MICHIGAN.

COMBINED REGULATOR AND FUSE FOR GENERATORS.

Application filed May 19, 1921. Serial No. 470,960½.

*To all whom it may concern:*

Be it known that I, FRED ALLISON, a citizen of the United States, residing at Highland Park, in the county of Wayne and State of Michigan, have invented new and useful Improvements in Combined Regulators and Fuses for Generators, of which the following is a specification.

The object of my invention is to provide new and useful improvements in a combined regulator and fuse for a generator of simple, durable, and inexpensive construction.

A further object of my invention is to provide, in connection with the generator, means for automatically regulating the current output therefrom, and in combination with this means, means for disconnecting the field coils of the generator from the generator circuit so that when the voltage rises to such a point that it might endanger the windings of the generator, the circuit will be broken to prevent damage to the generator.

In connection with the use of my improved device it will be understood that it is primarily intended for use on a generator used in connection with the ignition systems of automobiles, but that it may be successfully and advantageously used wherever a substantially fixed current output from the generator is desired, in spite of varying generator speeds. Where the generator is used in connection with the starting system of an automobile it is ordinarily directly connected with the crank shaft of the automobile motor, so that the generator speed is always directly proportional to the engine speed which is an extremely variable quantity. It is well known that automobile engines vary under driving and idling conditions from a relatively few revolutions per minute to a relatively high number of revolutions per minute, and it is also known that the current output from a generator is substantially proportional to the speed of rotation thereof. When the automobile engine is running at relatively high speed it, therefore, causes the generator to run at a relatively high speed and consequently the current output is so increased that it, in many instances, endangers the windings of the generator and, even in some instances, makes a fire possible.

In the construction of such generators it is essential to their proper operation that they be so constructed as to give predetermined current output sufficient for the purposes of the electric system in an automobile at an average engine speed, and all generators are so constructed. Devices have already been provided for the purpose of cutting out the generator from the balance of the electrical circuit, and some attempts have been made to insure a uniform or, substantially uniform, generator output at varying engine speeds.

With the foregoing explanation in mind, it is the object of my invention to provide a regulator device which will maintain the current output of the generator to within certain predetermined limits at any engine speed, so that the maximum charging efficiency of the generator may be obtained.

A further object of my invention is to provide means for automatically rendering the generator inoperative in case the current output thereof ever becomes such as to endanger the generator.

A further object of my invention is to provide, in connection with such a generator, a regulating and cutout device for the field coils thereof, which is designed to be connected into the field coil circuit so that the current passing thru these fields will be regulated within such limits that the generator may serve to furnish uniform current for the electrical system at substantially any engine speed.

A further object of my invention is to provide such a regulator with a coil which carries the field coil current, and which is so wound that when the field coil current rises to a certain predetermined point, the coil will be sufficiently energized to attract an armature toward it to thereby cut into the field coil circuit a resistance which will limit the current passing into the field coils sufficient to lower the output of the generator within the limits required by the electrical system of the automobile.

With these and other objects in view, my invention consists in the arrangement, combination, and construction of the various parts of my improved device, as described in the specification, claimed in my claims, and shown in the accompanying drawings, in which:

Figure 1 shows a top or plan view of the device embodying my invention,

Figure 2 shows a front elevation of the device disclosed in Figure 1,

Figure 3 shows an end elevation thereof,
Figure 4 shows an elevation of the opposite end of the device, and
Figure 5 is a diagram of the electrical circuits of the generator, showing only those parts used in connection with my invention and the wiring of the particular embodiment of the invention which is herein disclosed.

Referring to the accompanying drawings, I have used the reference numeral 10 to indicate, generally, the cross member of a yoke having side members 11 and 12, the latter being of somewhat greater length than the former. Fixed in the cross member 10 of the yoke and extending upwardly between the sides thereof, is a core member 13 upon which is wound a coil 14. This coil has one terminal thereof connected to a binding post 15, which is secured to the yoke member 12 by rivets 16. These rivets 16 are fixed in the yoke member 12 and in a binding plate 17. Insulated washers 18 and 19 allow the rivets 16 to pass therethru and are contiguous to opposite sides of an ear extending laterally from the binding post 15, so that the latter is separated from the yoke member 12, and insulated therefrom. In the diagram in Figure 5, the field coils are given the reference numeral 20, and are shown as being of the shunt type of field coils. The field coils 20 are connected together in series and the second end of this series circuit terminates in the negative brush 21 of the generator.

It will be understood, of course, that grounds may be used for completing the circuit, if desired. The postive brush 22 of the structure is connected thru the wire 23 with a contact member 24; this contact member 24 is mounted on the yoke member 11 at the side opposite the binding post 15, and is formed by extending a portion of a similiarly mounted binding post 25 to position above the end of the yoke member 11. This binding post 25 is insulated by insulating washers 26 and 27 from the yoke member 11. Extending forwardly from the binding post 25 is a bar 28 which is secured between the insulating washers 26 and 27 in position to contact with the binding post 25, the second end of this strip 28 being designed to support one end of my combined resistance and fuse member.

The opposite end of the combined resistance and fuse member is supported by a similar strip 29 which is mounted on the rivets 16 between the insulated washer 19 and the yoke member 12, so that the strip 29 is in contact with the yoke member but insulated from the binding post 15. The second end of the coil 14 is grounded into the yoke member.

Referring to the accompanying diagram, it will be seen that current taken off from the brushes 21 and 22 will pass thru the wire 23 to the contact 24 and binding post 25, which are of one piece of material, thence upwardly thru the strip 28 thru the combined resistance and fuse element 30, and thru the strip 29 into the yoke member; from the yoke member a coil passes thru the grounded end of the coil 14 into the coil and thence thru the field coils 20 back to the brush 21.

It has heretofore been noted that the arm 12 of the yoke member is somewhat longer than the arm 11, and mounted in this longer arm 12 in position to extend across above the end of the core 13 and between the contact 24 and the end of the member 11, is a movable armature member 31. This armature member 31 is, in the form of device here shown, held at the upper limit of its movement, that is, in contact with the contact 24 by a spring wire 32 which has one end fastened to the armature member 31 adjacent to the free end thereof.

In the form of device here shown the end of the spring 32, which is fastened to the armature, is hooked at 33 thru an ear which projects upwardly from the armature. Extending upwardly from the yoke member 12 is a fulcrum 34, over which the spring 32 is flexed. A second end of the spring 32 is fastened into the end of an arm 34 which extends laterally from the top of the yoke member 12 in a direction opposite to that in which the armature member extends. This arm 34 is of sufficiently pliable material so that the outer end thereof may be bent up and down to thereby adjust the position in which the second end of the spring 32 is held, thereby regulating the amount that the spring is flexed over the fulcrum 34; this, in turn, regulates the yieldable urge of the spring which tends to hold the armature into contact with the contact 24.

From the construction of the parts just described, it will be seen that the armature 31 is supported by and electrically connected with the yoke member, and that it is normally yieldably held into contact with a contact member 24 which, in turn, is insulated from the yoke member but connected with the positive brush of the generator. The normal circuit, therefore, thru my combined regulator and cutout device, is from the positive brush 22, thru the contact 24, the armature 31, and thence thru the coil 14 and the field coils 20 back to the negative brush 21. It will be seen that the armature 31 is so placed that the coil 14 will have a magnetic attraction therefor dependent upon the amount of current passing thru the coil 14. The latter is so wound and the tension of the spring is so adjusted that the current passing through the coil may build up to a given quantity and will be held at substantially that quantity, which of course must be within the safe limit for the electrical system of an automobile. When the current reaches this point, however, it will draw down the armature 31 thereby cutting the resistance 30 into the field coil circuit, and thereby automatically reducing the amount of current passing thru these field coils. This, in turn, will cause a drop in the output of the generator which will obtain until the current produced is less than enough to hold the armature 31 down away from the contact 24. As soon as the armature again comes in contact with the contact 24, the normal field circuit will be re-established to again cause the output to bear its normal relation to the speed of the generator.

Now, if the generator is being rotated at a speed which would normally cause the current output thereof to be greater than that which could be safely used in connection with electrical circuit of the automobile, it will be seen that the current output of the generator will be cut down to a safe amount by the intermittent cutting in of the resistance into the field coils circuit. In this situation the armature 31 will have a movement resembling that of a vibrator, and speed of the vibration will increase or diminish in proportion to the speed of the generator, thereby automatically increasing or decreasing the flux of the fields to thereby cause the current output to be substantially uniform at any generator speed.

In connection with the use of automobile electrical systems, it is customary to retain a substantially constant voltage in the charging circuit by floating a battery on the charging line so that the voltage remains substantially constant due to the fixed resistance of the battery. Under some circumstances, however, the battery becomes disconnected from the charging circuit and then there is no longer the battery resistance to regulate the voltage of the generator output, so that in such cases the generator voltage may possibly be increased to such an extent that the windings of the generator would be seriously endangered, if not destroyed.

My improved regulator and fuse device 30, is so arranged that the resistance thereof will cause it to fuse at a voltage just below that point at which the windings of the generator become endangered, so that it may, in addition to forming the resistance to regulate the current output, serve as a protector to prevent damage to the generator due to excess voltage. In connection with the fusing of the combined regulator and fuse device 30, it will be noted that this fusing action will only occur where the battery becomes disconnected from the charging circuit, which condition tends to increase the voltage considerably of the generator outfit; this increase impresses a higher voltage across the fields which have a set resistance, determined by the operating voltage of the machine, so that a higher amperage is caused as the voltage increases. It takes but a very short time to build up the voltage and consequently the amperage in the fields, so that the latter are burnt out, or damaged, after the battery has been cut out of the automobile circuit, so that my fusing device is very important both because it prevents the field coils from being damaged and prevents fire from being started at that point.

Among the many advantages of my improved device it may be mentioned that I am enabled to install it conveniently on, or, in a generator, as for instance, by means of the attaching ears 37 which may be formed uniformly with the yoke member and extended therefrom. It is also of such compact construction that it may just as readily be installed within the end cap of the generator as outside, so that it may secure the protection of the end cap without altering the form of an assembled generator or materially adding to the cost thereof. The device absolutely protects the generator from being burned out and in addition to that regulates the current output to any predetermined amount at all engine speeds. The resistance unit which also forms the fuse, is preferably made so that it may be readily detached from the strips 28 and 29, so that, in case it burns out, a new element may be slipped in between these strips without the use of tools. The device protects the automobile or other electrical system, against the dangers of fire and at the same time lengthens the life of the working parts of this system by regulating the current used therewith. Another advantage arising from the use of my combined fuse and resistance member is that I am, by its use, enabled to use coils of relatively small size and light weight, so that the regulator and cutout device may be installed, if necessary or desired, within the end cap of an ordinary generator.

Some changes may be made in the arrangement and construction of the various parts of my improved device without departing from the spirit of the invention therein, and it is my intention to cover by my claims such changes as may be reasonably included within the scope thereof.

I claim as my invention:

1. A regulating device comprising in combination, a fusible resistance element adapted to be connected in the field circuit of a generator, and means operated in accordance with a characteristic of the generator for varying the effective value of said resistance element.

2. In a device of the class described, a yoke member and coil therein, an armature movably mounted on and electrically connected with said yoke member and in position to co-act with said coil, a contact member mounted on said yoke in position to co-act with said armature, said contact member being insulated from said yoke, a fusible resistance element mounted on said yoke and electrically connected with said contact member and the yoke, and means for yieldingly urging said armature into contact with the contact member against the urge of the coil to short circuit said resistance element.

3. In a device of the class described, a yoke member having ears thereon adapted to be secured to a generator, a pair of binding posts spaced from each other and mounted on said yoke, said binding posts being insulated from the yoke, a coil mounted within said yoke, one end of said coil being grounded into the yoke and the other end being connected to one of said binding posts, a contact member connected to the other binding post, a movable armature member for said coil adapted to normally yieldingly contact with said contact member, and a fusible resistance element connected between the binding post which is connected to the contact member and the yoke, whereby an excessive current passing thru the coil may energize the latter to move the armature to break the short circuit thru the contact member and cause such circuit to pass around said resistance element.

FRED ALLISON.

Witness:
E. L. DAVIS.